United States Patent [19]

Rosenthal

[11] 4,053,740
[45] Oct. 11, 1977

[54] VIDEO GAME SYSTEM

[76] Inventor: Lawrence David Rosenthal, 7146 Saroni Drive, Oakland, Calif. 94611

[21] Appl. No.: 643,154

[22] Filed: Dec. 22, 1975

[51] Int. Cl.² ........................... A63F 9/00; G06F 3/14; G06F 15/44
[52] U.S. Cl. ................................. 364/705; 273/85 R; 273/DIG. 28; 340/324 A; 364/900; 364/731; 364/410
[58] Field of Search ............... 235/151; 273/DIG. 28, 273/85 R; 340/324 A, 324 AD, 172.5; 178/6.8, DIG. 22, 35

[56] References Cited

U.S. PATENT DOCUMENTS

| | | | |
|---|---|---|---|
| 3,659,284 | 4/1972 | Rusch ................................ | 178/6.8 X |
| 3,659,285 | 4/1972 | Baer et al. ......................... | 178/6.8 X |
| 3,778,058 | 12/1973 | Rausch .................... | 273/DIG. 28 X |
| 3,874,669 | 4/1975 | Ariano et al. ................ | 340/324 A X |
| 3,921,161 | 11/1975 | Baer .................................. | 178/6.8 X |

*Primary Examiner*—Joseph F. Ruggiero
*Attorney, Agent, or Firm*—David B. Harrison

[57] ABSTRACT

A self-contained operator responsive video game system is disclosed. The system is capable of generating a virtually unlimited number of games where a player responds to and controls high resolution objects drawn on a display device such as a cathode ray tube. The system includes two interdependent sections, a computational section and a display section. The computational section includes means for entering operator commands, a program memory for storing the game rules and a digital processor for determining trajectories of moving objects and generating the line segment specification parameters required by the display section. The display section includes the same digital processor included in the computational section for transforming the line segment specification parameters into digital line drawing values and generating timed gating signals, digital-to-analog converters for converting the digital line drawing values into proportional signals and display drivers for generating the specified line segments on the screen of the cathode ray tube. Composites of the line segments repetitively drawn ultimately result in recognizable animated objects.

14 Claims, 9 Drawing Figures

INSTRUCTION FORMATS
FORMAT 1:
single word
8 bit operator
no operand
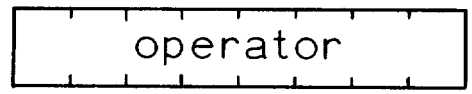
FORMAT 2:
single word
4 bit operator
4 bit operand
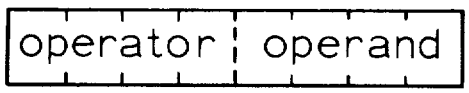
FORMAT 3:
double word
8 bit operator
8 bit operand
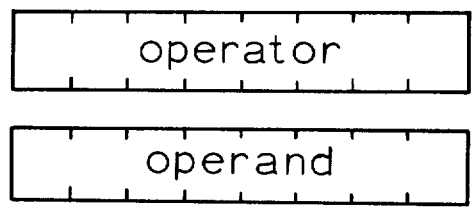
FORMAT 4:
double word
4 bit operator
12 bit operand
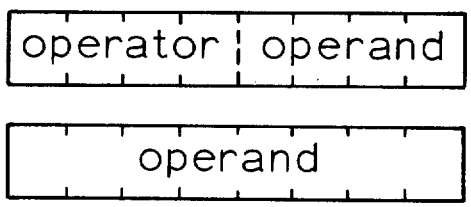
FIG 3

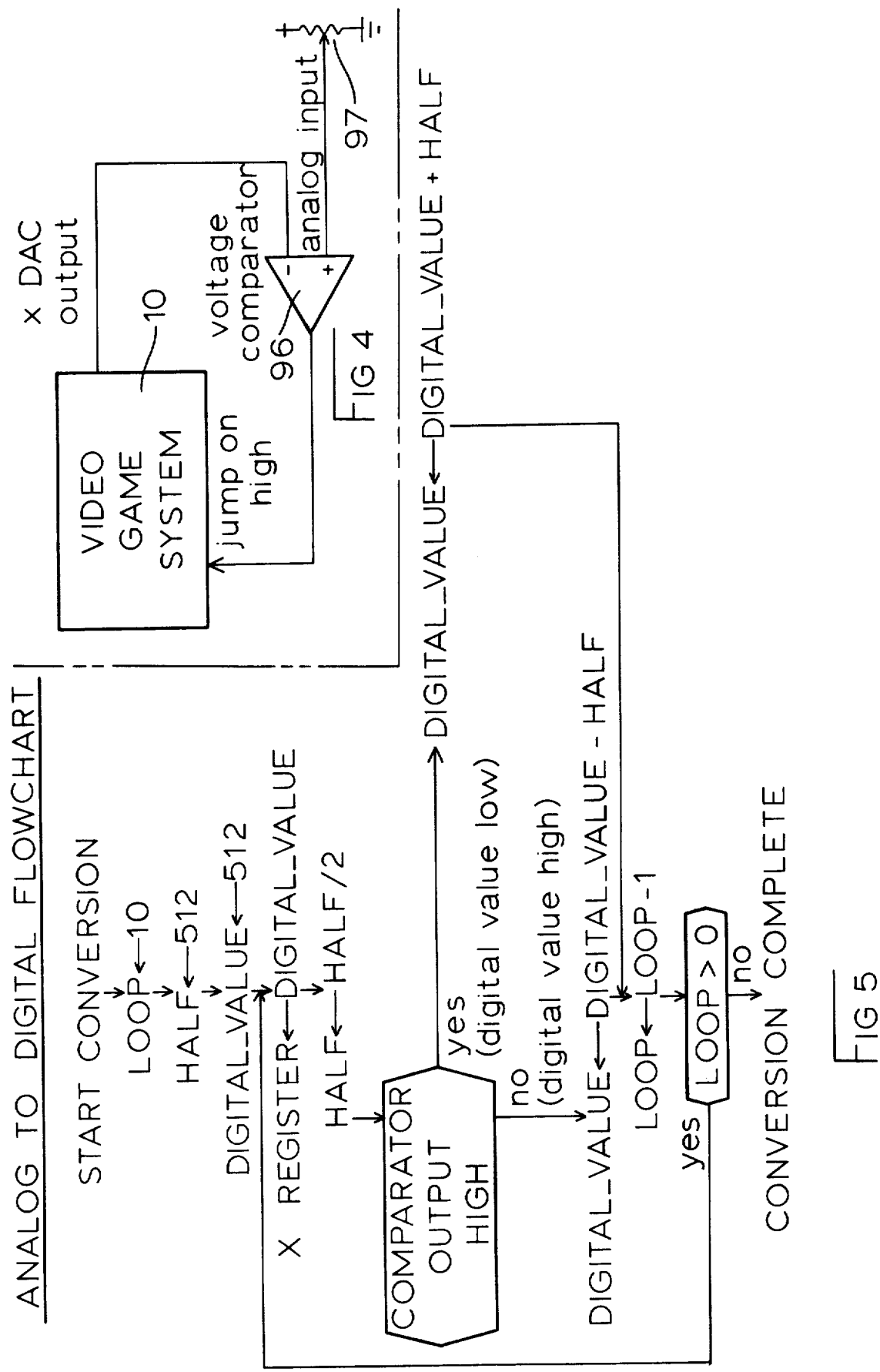

CRT DISPLAY

LINE DRAWING FLOWCHART

VIDEO GAME SYSTEM

BACKGROUND OF THE INVENTION

The present invention relates to a special purpose computer having a visual display which is capable of providing realistic graphic simulations. More particularly, the present invention provides a programmable operator interactive video simulator particularly useful for playing video games.

Electronic video game machines are well known in the game art. Typically, such devices utilize conventional raster scan television broadcast receivers connected to special circuits generating television compatible signals. The signals generated by such game circuits cause dots, squares, or other overly simplified and crude objects to appear on the television screen. Usually the crude geometric objects are said to represent more complex objects necessarily requiring substantial imagination on the part of the operator to perceive the intended representation. The poor simulation quality is a problem which is inherent in a standard television receiver employing a raster scan display. With standard television receivers, solid diagonal or vertical lines are not possible, and specification of objects other than extremely simple ones require substantial quantities of complex data at high speeds.

Existing video game machines are inflexible. A machine designed to simulate a rebound game such as ping-pong would require substantial changes in circuitry before it could be utilized for simulating, for example, a road race with any degree of realism. Also, the computational abilities of most prior art electronic game systems are very limited, thereby causing displayed objects to move along simple and unrealistic trajectories. The limited computational power of those machines additionally limits the number of different situation an operator can find himself in, causing the interest generated by the introduction of a new game to be lost very quickly.

On the other hand, complex high speed general purpose computers have heretofore been used with peripheral graphic display systems to generate sophisticated visual simulations. While such systems are limited only by factors such as programming and as such are capable of playing fascinating games with visually realistic simulations, the high costs of such systems heretofore make them entirely impractical and unavailable in the video amusement art.

SUMMARY OF THE INVENTION

With the foregoing and other limitations and drawbacks of the prior art in mind, one object of the present invention is to provide a completely self-contained video simulator which combines a special purpose digital computer and a display system into a single unit dedicated to the purpose of providing operator interactive graphic simulations.

Another object of the present invention is to provide a programmable video simulator which is capable of being programmed and reprogrammed to provide virtually an unlimited variety of games and other simulations each having its own operational rules and degree of required skill and difficulty.

A further object of the present invention is to provide a programmable video simulator wherein a substantial number of circuit elements serve multiple functions.

Yet another object of the present invention is to provide a viewer interactive simulator system that generates a high resolution visual display of controlled objects wherein the system is simple to manufacture, operate and maintain and uses far fewer components and is thus far less expensive to manufacture than other units capable of equally sophisticated performance.

The self-contained programmable visual simulation system of the present invention includes in one preferred embodiment two highly interdependent sections: a computational section and a display section. The computational section includes an entry port for entry of operator commands, a program memory for storing the instructions specifying the simulation, and a digital processor for determining the trajectories of moving objects and generating the line segment specification parameters required by the display section. The display section includes a digital processor for converting the line segment specification parameters into line drawing values and generating timed gating signals, digital-to-analog converters for converting the line drawing values into proportional signals and display drivers controlling a display device such as a cathode ray tube.

The digital-to-analog converters included in the display section can also be used in conjunction with appropriate instructions to realize analog-to-digital conversions. The availability of circuitry for performing analog-to-digital conversions allows analog commands from the operator control panel to be handled by the digital processor.

To reduce complexity and cost, both the computational section and display section are dependent on the same digital processor.

Two separate memories are included in the computational section, a working storage memory and a program memory. The program memory may be a read only memory containing the instructions, data and lookup tables necessary for generating a given simulation or defining a particular video game. More than one program memory may be readily included within the system. Thus, games may be changed completely, simply by switching between different program memories. Utilizing a working storage memory separate from the program memory also speeds up the operation of the system, since information from both memories may be accessed simultaneously. Further economies of system hardware are realized by including the specification of the operations necessary to the generation of line segments within the set of instructions stored in the program memory.

The visual display drivers are connected to drive a visual display device such as a cathode ray tube in response to the proportional signals from the digital-to-analog converters as well as the timed gating signals received from the digital processor in order to provide on the screen of the cathode ray tube realistic simulations of complex objects that change orientation, size, and position and even shape in accordance with operator commands and the rules of the simulation or video game.

The system also includes a multiple operator control panel providing entry of operator commands. The system may also provide a plurality of output ports to enable further interaction with the operator. Sound effects, lights, coin boxes and other devices may be controlled from these output ports.

A preferred method of operating the present invention includes the steps of entering operator commands into the visual simulation system to enable it to respond to those commands, storing within the system the data needed to generate and orient the visual simulations, also storing within the system the rules needed to govern the simulations, generating digital line segment parameters and time line segment gating signals from the stored data in accordance with the rules and the operator commands, converting digital line segment values into proportional signals, and creating visual line segments on a display screen in accordance with the proportional signals and the timed line segment gating signals so that a combination of displayed line segments provides as a composite a visual simulation of at least one object having a controllable size, orientation and movement.

Other objects, advantages and features of the invention will become readily apparent from the following detailed description of one embodiment which is presented in conjunction with the accompanying drawings.

BRIEF DESCRIPTION OF THE DRAWINGS

FIG. 3 is a diagram explaining the four different instruction formats recognized by the computational section of FIG. 2A.

FIG. 4 is a block and schematic diagram of an analog-to-digital converter utilizing the control and processing unit of the system of FIG. 1.

FIG. 5 is a flowchart describing the operation of the analog-to-digital converter program controlling the analog-to-digital converter of FIG. 4.

DETAILED DESCRIPTION OF A PREFERRED EMBODIMENT

Figure 1:
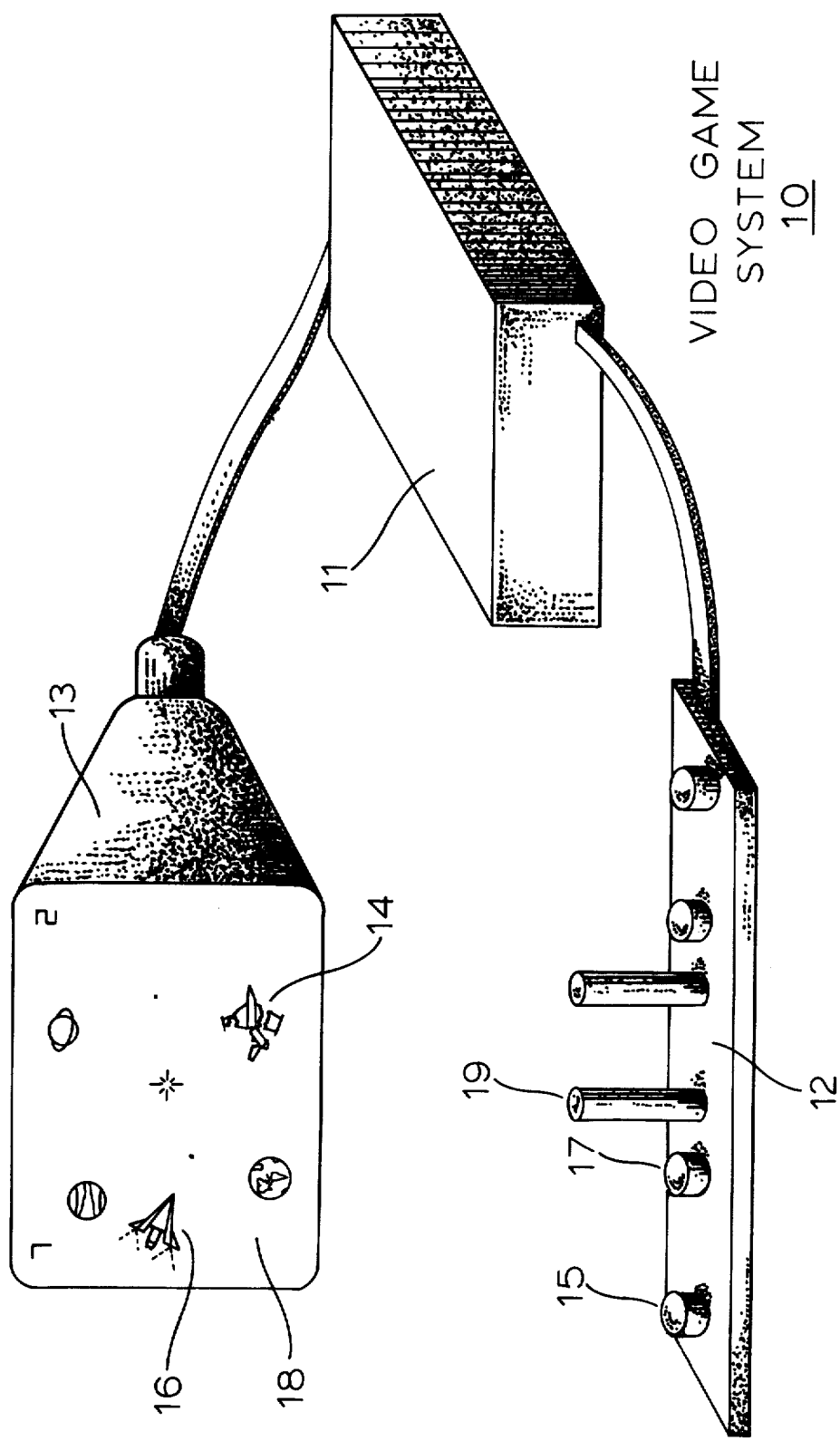
FIG. 1 is a perspective view of a preferred embodiment of the video game system of the present invention including a display device, operator's console and a control and processing unit.
Figure 2A:
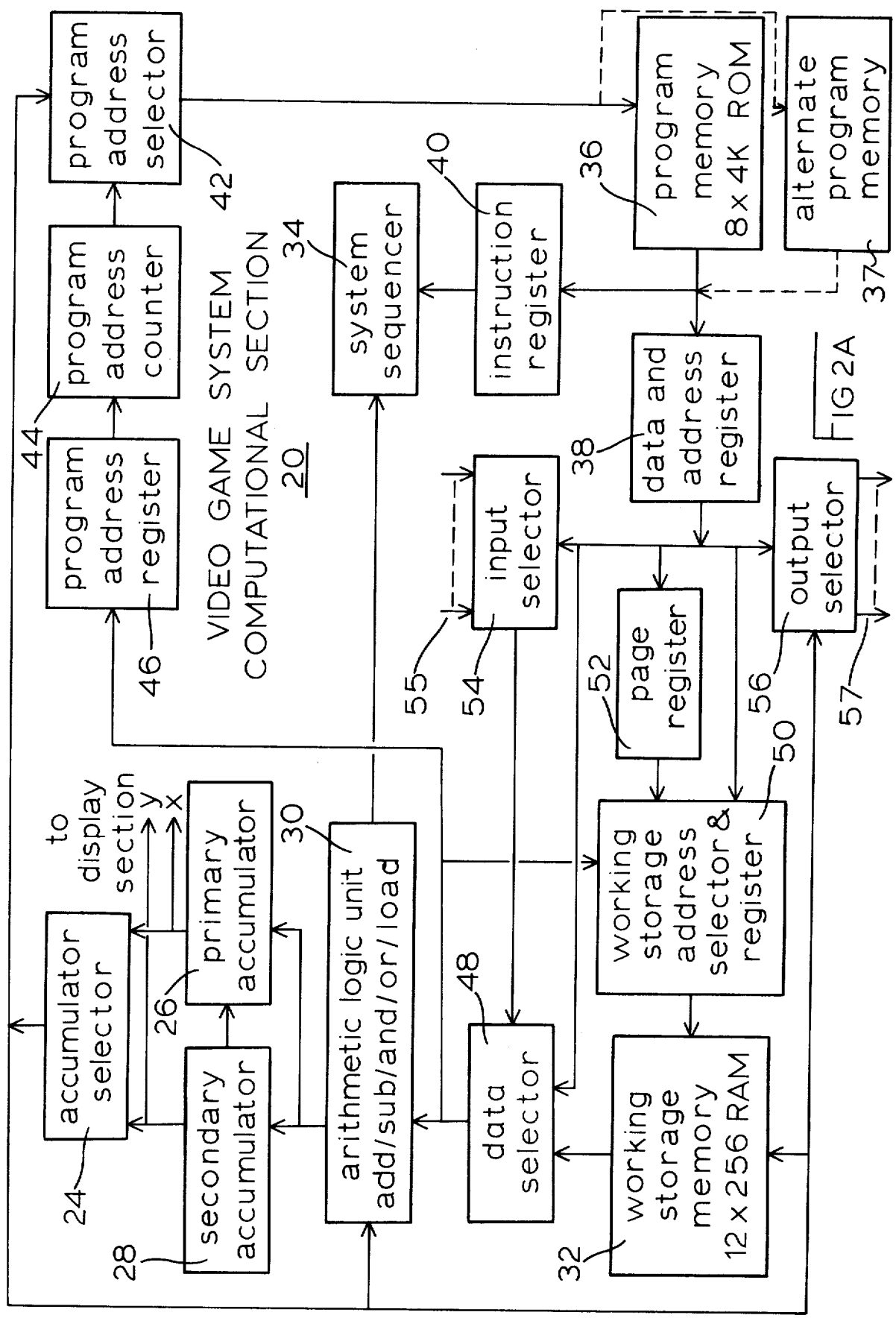
FIG. 2A is a block diagram of the computational section of the system of FIG. 1.
Figure 2B:
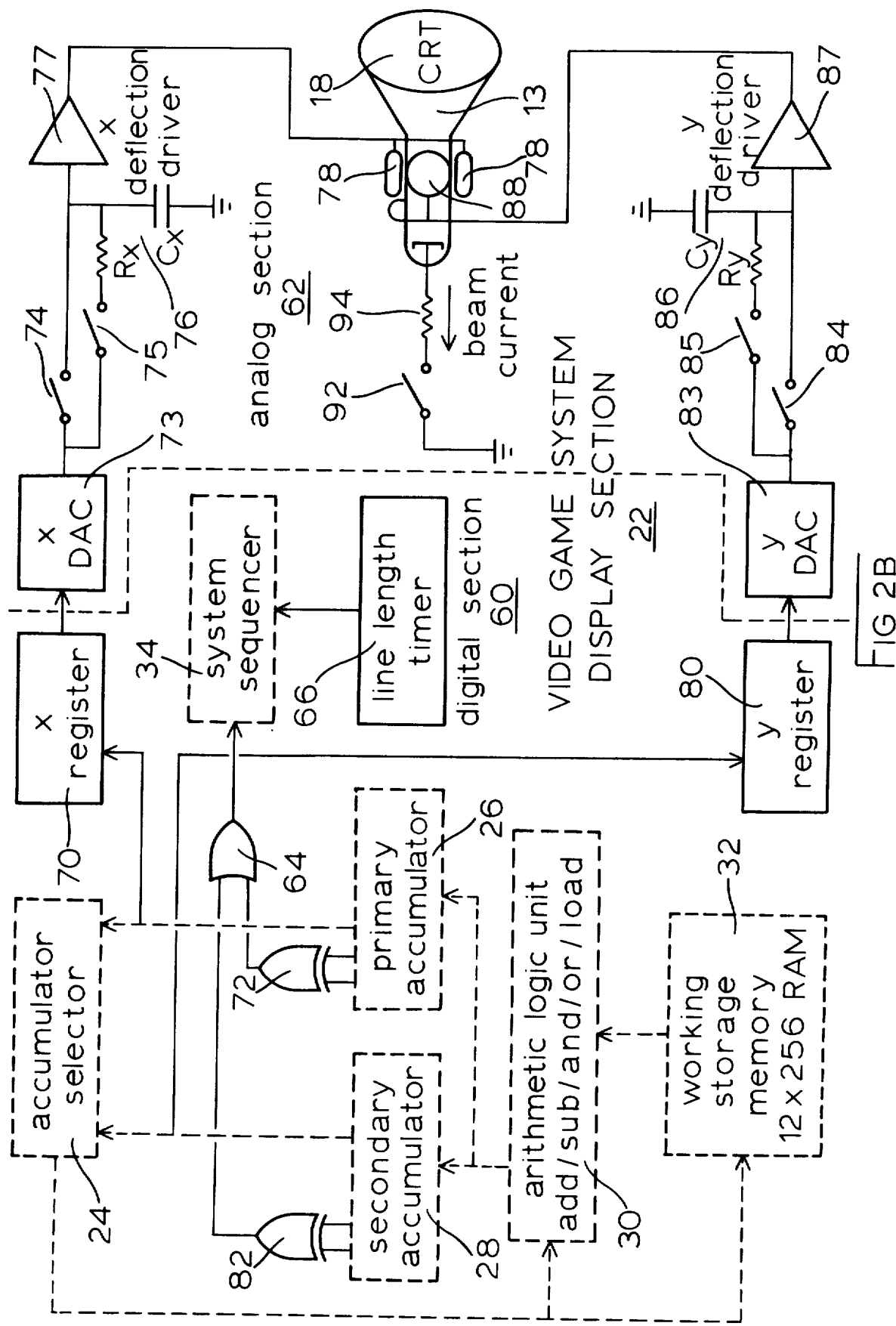
FIG. 2B is a block and partial schematic diagram of the display section of the system of FIG. 1.

Referring to FIGS. 1, 2A and 2B, a video game system 10 which is configured for a 2 player (operator) interactive game, for example, space war is shown; the system 10 includes a control and processing unit 11, an operator's console 12, and a display device 13 with rocket ship images 14 and 16 displayed on the screen 18 thereof. The console 12 includes controls 15, 17 and 19 which enable two players to control e.g., the space ships 14 and 16 or other visual images respectively, to engage them e.g., in a space war combat game.

As shown in FIG. 2A, the control and processing unit 11 of the video game system 10 includes a computational section 20, and as shown in FIG. 2B, a display section 22. An accumulator selector 24, a primary accumulator 26, a secondary; accumulator 28, an arithmetic logic unit 30, a working storage memory 32, and a system sequencer 34, (enclosed in broken boxes in FIG. 2B) make up the functional units which are common to both the computational section 20 and the display section 22.

COMPUTATIONAL SECTION FIG. 2A

The computational section 20 includes two independent memory systems: a 256 word by 12 bit (256 words each being 12 bits in length) random access working storage memory 32 and a 4096 word by 8 bit read only program memory 36. The computational section also includes a primary accumulator 26, a secondary accumulator 28, an arithmetic logic unit 30 and associated multiplexers and registers for routing and holding data and addresses.

The 4096 word by 8 bit program memory 36, contains all of the instructions and data necessary for the definition and operation of a particular game ("space war" being one example given: in the present embodiment). An alternate program memory 37 may be included to provide the system with two separate games. The output lines from the program memory 36 are connected to both a data and an address register 38 and an instruction register 40. Connected to the output of the instruction register 40 is the system sequencer 34 which is responsible for decoding the instructions and controlling the operation of the video game system 10 in accordance with the decoded instructions. Connected to the address decoders of the program memory 36 is a program address selector 42 which receives addresses from either the primary accumulator 26 or the secondary accumulator 28, as determined by an accumulator selector 24, and also from a program address counter 44. The program address counter 44 normally sequentially increments a program address; however, in the event of the execution of a JUMP instruction it loads from a program address register 46. Prior to the execution of a JUMP, i.e. branch, instruction the desired address to be branched to is loaded into the program address register 46 from a working storage memory 32 or a data and address register 38 through a data selector 48.

A second memory system, a 256 word by 12 bit random access memory (RAM) functioning as a working storage memory 32, temporarily stores intermediate and final computational values necessary to the operation of the video game system 10. The data input lines to the working storage memory 32 are connected to the selected accumulator 26 or 28 through the accumulator selector 24. Connected to the address decoders of the working storage memory 32 is a working storage address; selector and register 50 which receives addresses from both the working storage memory 32 through a data selector 48 and from a combination of a page register 52 and a data and address register 38. Arithmetic and logic operations are performed in the arithmetic logic unit 30, the output lines of which are connected to both the primary and secondary accumulators 26 and 28. Control lines from the arithmetic logic unit 30, specifying whether an operation yielded a result less than, greater than or equal to zero, are connected to the system sequencer 34. Data operated upon in the arithmetic logic unit 30 is received from two sources: the accumulator selector 24 selecting from either the primary or secondary accumulator 26 or 28 and the data selector 48 selecting from the working storage memory 32, the data and address register 38, or an input selector 54 which receives information from the operator's console 12.

Also included in the computational section 20 is an output selector 56 which is connected to two sources: a selected accumulator 26 or 28 through the accumulator selector 24 and the data and address register 38.

DISPLAY SECTION FIG. 2B

The display section 22 includes two subsections; a digital section 60 and an analog section 62. The digital section 60 may be further subdivided into an x component subsection and a y component subsection.

The x component subsection of the digital section 60 includes the primary accumulator 26 connected to both an x register 70 and an exclusive OR gate 72. The y component subsection of the digital section 60 includes the secondary accumulator 28 connected to both a y register 80 and an exclusive OR gate 82. Outputs from the exclusive OR gate 72 of the x component subsection and the exclusive OR gate 82 of the y component subsection provide the two inputs to an OR gate 64, the output of which is connected to the system sequencer 34. The accumulator selector 24, the arithmetic logic unit 30 and the working storage memory 32 are common to both the x and y subsections of the digital section 60. Also included in the digital section 60 is a line length timer 66 for determining the correct drawing times for lines of varying lengths.

The analog section 62 of the display section 22 is similarly divided into two identical subsections: an x component subsection and a y component subsection. The x component subsection of the analog section 62 includes an x component digital-to-analog converter (DAC) 73, an x component initial position switch 75, an RC shaping network 76 including in combination a resistor $R_x$ and a capacitor $C_x$, and an x component deflection driver 77 the output of which is connected to drive an x deflection coil 78.

The y component subsection of the analog section 62 includes a y component digital-to-analog converter 83, a y component initial position switch 84, a y component line drawing switch 85, an RC shaping network 86 including in combination a resistor $R_y$ and a capacitor $C_y$, and a y component deflection driver 87 the output of which is connected to drive a y deflection coil 88. While a magnetically deflected cathode ray tube (CRT) 13 is illustrated, an electrostatically deflected CRT display, or other equivalent display devices would be equally suitable.

The analog section 62 also includes a beam current switch 92. The beam current switch 92 connects a cathode resistor 94 to ground which permits a beam current to flow enabling a display on the screen 18 of the CRT 13. The switches 74, 75, 84, 85 and 92 are all digitally controlled high speed semiconductor devices. The vector generating techniques employed in the system 10 of the present invention are disclosed in my copending application, Ser. No. 612,045, filed on Sept. 10, 1975, reference to which is made for further particulars.

PROGRAM MEMORY 36

The 4096 word by 8 bit program memory 36, containing all of the instructions and data necessary for the specification and operation of a particular game, functions as a read only memory (ROM). During the execution of a program the contents of the program memory 36 are accessed but never modified. Because of the read only requirements of the program memory 36, memory circuits with non volatile contents encoded prior to installation are ideal. The memory circuits that can be incorporated into the program memory 36 are not restricted to the read only variety. Read/write memory circuits requiring the contents to be loaded every time the power is turned on can also be used. The use of read/write memory circuits would enable a user to select one of several game programs stored on a magnetic surface to be loaded into the program memory 36 prior to play.

The 8 bit word length selected for use by the program memory 36 represents a compromise between maximum operating speed and minimum storage requirements. Using an 8 bit word length enables a game program to be stored in the memory at a close to minimum number of total bits at the sacrifice of only a small to moderate reduction in speed, as compared to the speeds which might be obtained by using longer words but which results in a less densely, and thus less efficiently, packed memory. 8 bits is also a standard word size for most large (16,384 bit) ROMs.

INSTRUCTION FORMATS, FIG. 3

The instructions stored in the program memory 36 consist of either an operator, or an operator followed by an operand. For example, in the case of the ADD instruction, the operator specifies an add operation while the operand, being an address in this case, specifies the location of the word to be added. As shown in FIG. 3, the instructions for use with the video game system 10 are arranged in four different formats. The format in which an instruction is stored is determined by the length of both the operator and the operand. Being limited to the use of a maximum of 8 bits per word, the double word instruction formats shown in FIG. 3 are necessary for instructions wherein the combined length of the operator and operand exceeds 8 bits.

Identification of the instruction format resulting in the separation of the operator from the operand is accomplished by the system sequencer 34. Initially, the first word of an instruction is read from the program memory 36 and simultaneously loaded into both the data and the address register 38 and the instruction register 40. Next the system sequencer 34 having access to the contents of the instruction register 40 decodes the lower 4 bits ($b_0$–$b_3$) of the instruction. The lower 4 bits of the first word of an instruction besides specifying or partially specifying an operation also contain the information necessary for determining the instruction format. The lower 4 bits classify the upper 4 bits ($b_4$–$b_7$) of the same first word of the instruction as operator or operand and also specify whether or not the instruction is split into two words.

Classification as a format 1 instruction as shown in FIG. 3 causes the contents of the data and address register 38 to be ignored and the operation specified by the 8 bit operator in the instruction register 40 to be executed. Classification as a format 2 instruction as shown in FIG. 3 causes the contents of the upper 4 bits ($b_4$–$b_7$) of the data and address register 38 to be used as an operand (data or address) and the operation specified by the 4 bit operator in the lower 4 bits ($b_0$–$b_3$) of the instruction register 40 to be executed. Classification as a format 3 instruction as shown in FIG. 3 causes the next word in the program memory 36 to be read and the contents loaded into the data and address register 38. After the data and address register 38 is loaded with the second word of the instruction the 8 bit content of the data and address register 38 is specified for use as an operand (data or address) and the operation specified by the 8 bit operator in the instruction register 40 is executed. Classification as a format 4 instruction as shown in FIG. 3 initially causes the contents of the upper 4 bits ($b_4$–$b_7$) of the data and address register 38 to be used as an operand (data or address) and the operation specified by the lower 4 bits ($b_0 - b_3$) of the instruction register 40 to be partially executed. After the operand contained in this upper 4 bits of the data and address register 38 has been operated upon the next word in the program memory 36 is loaded into the data and address register 38. The second word of the instruction contained in the data and address register 38 is specified for use as an operand (data or address) and the remainder of the operation specified by the 4 bit operator in the lower 4 bits of the instruction register 40 is executed.

The ADD 4 IMMEDIATE, SUBTRACT 4 IMMEDIATE, ADD 8 IMMEDIATE and SUBTRACT 8 IMMEDIATE instructions necessitate determining the instruction format on the basis of the information contained in all 8 bits of the first word of the instruction instead of on the basis of the information contained in just the lower 4 bits as is the situation with all the other instructions. In writing a game program it is very often necessary to specify addition or subtraction of a constant having a value of 15 or less. The addition or subtraction of a constant of value 15 or less is specified by a format 2 instruction containing the operator in the lower 4 bits and the operand, a value between 1 and 15, in the upper 4 bits. Carrying the operand in a second word is neither necessary nor desirable in terms of both operating speed and storage efficiency. Carrying the operand in the second word is necessary, however, when the addition or subtraction of a constant greater than 15 is called for. The addition or subtraction of a constant greater than 15 is specified by a format 3 instruction containing the operator in the first word and the operand, a value between 16 and 255, in the second word. If the number of different operations capable of being specified by a 4 bit operator were not limited to 16, a special algorithm to identify the instruction formats of the add and subtract immediate instructions would not be necessary. Because the number of different operations capable of being specified by a 4 bit operator are limited, both the ADD 4 IMMEDIATE and ADD 8 IMMEDIATE instructions share one 4 bit operator and both the SUBTRACT 4 IMMEDIATE and SUBTRACT 8 IMMEDIATE instructions share a second 4 bit operator.

Adding or subtracting a value of zero in a program is nonsense. Thus, placing a zero in the upper 4 bits ($b_4 - b_7$) of the first word of an add or subtract immediate instruction is used to signify that the operand is contained in the following second word. A non-zero value in the upper 4 bits of the first word of an add or subtract immediate instruction causes the upper 4 bits themselves to be recognized as the operand and not the contents of the next word.

COMPUTATIONAL OPERATIONS

The arithmetic logic unit 30 together with the primary and secondary accumulators 26 and 28, all of which handle 12 bit words, perform all of the arithmetic and logic operations necessary to the operation of the video game system 10.

ADDITION, SUBTRACTION and AND operations are performed in the arithmetic logic unit 30, and the results of each selected operation are loaded into either the primary accumulator 26 or the secondary accumulator 28, depending upon which one is selected. Prior to the execution of one of the three arithmetic or logic operations two operands are connected to the two sets of input lines on the arithmetic logic unit 30. One set of input lines is connected to the contents of either the primary accumulator 26 or the secondary accumulator 28 as determined by the accumulator selector 24. The second set of input lines is connected to the contents of either the data and address register 38, the selected word in the working storage memory 32, or an external input line 55 selected by the input selector 54. The connection to the second set of input lines is determined by the data selector 48.

The operation specified by the LOAD instruction is performed by passing the contents of either the data and address register 38, the selected word in the working storage memory 32, or the selected external input line 55 as selected by the data selector 48 directly through the arithmetic logic unit 30 and into the selected accumulator 26 or 28.

Selection of either accumulator 26 or 28 is determined by the state of a flip flop (hereinafter referred to as the accumulator flip flop) included in the system sequencer 34. The accumulator flip flop in the cleared state enables the primary accumulator to be loaded and shifted with the accumulator selector 24 connecting the primary accumulator 26 to a set of input lines from the arithmetic logic unit 30. Similarly, the accumulator flip flop in the set state enables the secondary accumulator to be loaded and shifted with the accumulator selector 24 connecting the secondary accumulator 28 to the same set of input lines from the arithmetic logic unit 30. The accumulator flip flop is set by executing the SECONDARY ACCUMULATOR instruction. With the exception of the SECONDARY ACCUMULATOR instruction the accumulator flip flop is cleared at the end of the execution of every instruction. At the end of the execution of the SECONDARY ACCUMULATOR instruction the accumulator flip flop is left in the set state. Thus, unless an instruction is directly preceded by the SECONDARY ACCUMULATOR instruction, or unless an instruction calling for the simultaneous shifting of both accumulators 26 and 28 is specified, the primary accumulator 26 will be selected.

Most of the arithmetic and logic operations specified by a typical game program are performed using the primary accumulator 26. The secondary accumulator 28 is used primarily to facilitate handling double precision arithmetic and storing current values of variables such as loop counters which are repetitively incremented or decremented. Including the secondary accumulator 28 in the system 10 also simplifies execution of arithmetic operations such as multiplication or division. To further simplify multiplication a MULTIPLY instruction is included in the instruction set of the video game system 10 to greatly reduce the number of program steps necessary to generate the product of two 12 bit numbers. The MULTIPLY instruction causes both the primary and the secondary accumulators 26 and 28 to be shifted right one place simultaneously and the contents of the selected word from the working storage memory to be added to the secondary accumulator if a one was shifted out from the least significant bit position of the primary accumulator 26. During the execution of the MULTIPLY instruction the least significant bit of the secondary accumulator 28 is connected to the most significant bit of the primary accumulator 26 thereby creating a shift register 24 bits in length.

Using both accumulators 26 and 28 and the MULTIPLY instruction, the steps necessary to perform a multiplication are as follows: (a) set the secondary accumulator 28 to zero, (b) load the multiplicand into the primary accumulator 26, (c) in the working storage memory 32 select the word containing the multiplier, (d) execute the MULTIPLY instruction 12 times, the result of steps a through d is a product up to 24 bits in length with the higher order bits contained in the secondary accumulator 28 and the lower order bits in the primary accumulator 26.

Selecting a word in the working storage memory 32 is accomplished by loading the 8 bit address of the word to be selected into the working storage address selector and register 50. One method of loading an address into the working storage address selector and register 50 involves the simultaneous loading of the four high order bits from the page register 52 and the four low order bits from the data and address register 38. This simultaneous loading of the working storage address selector and register 50 from the two registers 28 and 52 is performed during the execution of any of the following memory access instructions: LOAD, STORE, ADD, SUBTRACT, TEST and INDIRECT ADDRESS. The four low order bits of the address contained in the data and address register 38 originated in the 4 bit operand field of the instruction being executed. The four high order bits of the address contained in the page register 52 were loaded during the execution of the LOAD PAGE instruction and remain unchanged until the LOAD PAGE instruction is again executed. Storing half of the bits necessary to the selection of a word from the working storage memory 32 in a separately loaded page register 52 permits both the specification of a memory access operation and the selection of a working storage memory location by a single word instruction. If the entire address were carried along with the specification of the operation a double word instruction would be necessary. Thus, the page register 52 reduces the storage requirements for memory access instructions from two words to one word. Reducing the number of words having to be accessed from the program memory 36 also increases the operating speed of the video game system 10, an important design criterion.

While leaving the contents of the page register 52 unchanged, the number of working storage memory locations capable of being selected is limited to 16. Being able to address only a small number of working storage memory locations without having to reload the page register 52 does not significantly reduce the advantage gained by splitting the loading of the address. Most game programs can be separated into a number of different routines with each routine accessing a specific group of variables from the working storage memory 32. When variable locations are assigned such that variables associated with a particular routine are all selected with one fixed value in the page register 52, the number of times that the page register has to be reloaded during the overall execution of a program becomes insignificantly small.

The second method of loading an address into the working storage address selector and register 50 involves loading the contents of the word in the working storage memory 32 selected by the address in the working storage address selector and register 50 into the same register 50. Loading the working storage address selector and register 50 with the contents of the lower eight bits of the selected word is accomplished by executing the INDIRECT ADDRESS instruction. The INDIRECT ADDRESS instruction is extremely important since it enables the use of subscripted variables. After an INDIRECT ADDRESS instruction is executed, it is necessary to execute a memory access instruction without modifying the contents of the working storage address selector and register 50. The LOAD PREVIOUSLY SELECTED, STORE PREVIOUSLY SELECTED, ADD PREVIOUSLY SELECTED, SUBSTRACT PREVIOUSLY SELECTED, AND PREVIOUSLY SELECTED, and INDIRECT ADDRESS PREVIOUSLY SELECTED instructions all access the working storage memory word previously selected. They do not modify the contents of the working storage address selector and register 50 by loading in the contents of the page register 52 and an operand field.

The instructions read from the program memory 36 are selected by the 12 bit address contained in the program address counter 44. During the execution of a program the address contained in the program address counter 44 is incremented by single counts unless a branch is specified. Incrementing the program address counter 44 by single counts causes the instructions stored in the program memory 36 to be read in sequential order. Reading instructions from the program memory 36 in non-sequential order is accomplished by specifying a branch. Specification of a branch causes the contents of the program address register 46 to be loaded into the program address counter 44. After the new address is loaded into the program address counter 44 instructions starting at the new address are again read from the program memory 36 in sequential order.

Before a branch is specified, the address of the new location in the program memory 36 to be accessed is loaded into the program address register 46. The program address register 46 is loaded upon execution of either the LOAD PROGRAM ADDRESS PREVIOUSLY SELECTED or LOAD PROGRAM ADDRESS IMMEDIATE instruction. The LOAD PROGRAM ADDRESS PREVIOUSLY SELECTED instruction loads the word in the working storage memory 32 previously selected by the contents of the working storage address selector and register 50 through the data selector 48 into the program address register 46. The LOAD PROGRAM ADDRESS IMMEDIATE instruction loads the 12 bit address contained in the operand field of the instruction through both the data and address register 38 and the data selector 48 into the program address register 46. The LOAD PROGRAM ADDRESS PREVIOUSLY SELECTED instruction is primarily used to facilitate subroutine returns. Prior to transferring to a subroutine the return address is loaded into the working storage memory 32 at the location selected by the subroutine upon execution of the LOAD PROGRAM ADDRESS PREVIOUSLY SELECTED instruction. Being able to store the return address from a subroutine in the working storage memory 32 eliminates the requirement for an address stack found in other machines having subroutine capability.

A branch or discontinuity in the sequential accessing of words from the program memory 36 occurs after the successful execution of a JUMP instruction. A JUMP instruction can be either conditional or unconditional. The JUMP instruction included in the instruction set of the video game system 10 causes a branch to occur unconditionally. A JUMP instruction is executed by loading the contents of the program address register 46 into the program address counter 44. The JUMP ON ZERO, JUMP ON LESS THAN ZERO, JUMP ON GREATER THAN ZERO, JUMP ON VECTOR NOT FINISHED and JUMP ON HIGH instructions, which are also included in the instruction set of the system 10, cause branches to occur only if the conditions specified by the instructions are true. If the conditions necessary for the execution of a conditional jump are not true, the program address counter 44 is incremented by a single count thereby continuing the accessing of the instructions from the program memory 36 in sequential order. The JUMP ON ZERO, JUMP ON LESS THAN ZERO and JUMP ON GREATER THAN ZERO instructions are self explanatory, conditioned upon the results of the arithmetic and logic operations performed during the execution of a program. Each time an arithmetic or logic operation is performed, flip flops are set, thereby indicating that the result is less than, greater than, or equal to zero. The JUMP ON VECTOR NOT FINISHED instruction causes a branch to be executed if a line segment is in the process of being drawn on the CRT display 18. The JUMP ON HIGH instruction causes a branch to be executed if a high level is present on an external input line.

Without causing a branch or discontinuity in the sequential accessing of instructions from the program memory 36, words loacted at random locations in the same memory 36 can also be accessed. The LOOK-UP instruction included in the instruction set causes the contents of the word in the program memory 36 selected by an address contained in the selected accumulator 26 or 28 to be loaded into the same selected accumulator 26 or 28. Execution of the LOOK-UP instruction causes the program address selector 42 to select the contents of the selected accumulator to address the program memory 36. After the word selected by the address contained in the selected accumulator 26 or 28 is loaded into the same selected accumulator 26 or 28, the contents of the program address counter 44 are again selected by the program address selector 42 thereby enabling the sequential accessing of instructions to continue. The LOOK-UP instruction is used for retrieving data stored in the program memory 86 and for facilitating table look-ups. Using the LOOK-UP instruction for table look-ups, complex functions such as sines or gravitational forces can be solved efficiently by loading an argument into the selected accumulator and the solutions corresponding to all possible arguments in a table at locations in the program memory 36 addressed by the arguments.

External control signals to the video game system 10 are connected to single bit input lines 55. Connecting the controls exemplified by the push buttons 15 and 17 and joy sticks 19 shown on the control console 12 in FIG. 1 to these input lines 55 enable an operator to control the operation of the system 10 during the execution of a video game program. The READ instruction included in the instruction set causes the level (0 or 1) at the input line 55 selected by the input selector 54 according to the address contained in the operand field of the instruction to be loaded into the least significant bit position of the selected accumulator 26 or 28. Depending on whether a zero or a one is loaded into the selected accumulator 26 or 28, different conditions are thereby established for determining whether or not a branch will be executed upon specification of a particular conditional JUMP instruction. Thus, decisions influencing the operation of a program being executed are made, based on the levels applied to the external input lines 55.

DISPLAY GENERATION

The operation of the display section 22 is controlled by instruction included in the instruction set along with all of the computational instructions. Including the vector generating instructions in the instruction set greatly facilitates the sharing of components common to both the computational section 20 and display section 22, an important feature of the present invention.

Prior to executing one of the special display section control instructions, the value of the $x$ coordinate of the initial point of the line segment to be drawn on the CRT display 18 offset by 1024 is loaded into the primary accumulator 26 and the value of the $y$ coordinate of the initial point offset by 1024 is loaded into the secondary accumulator 28. The 1024 offset is necessary to achieve the correct positioning of a line segment on the screen 18. Within the display section 22, coordinate point (0,0) on the display screen 18 is actually digital coordinate point (1024,1024). The steps of determining the $x$ and $y$ coordinates values, adding the 1024 offsets and loading the results into the appropriate accumulators are all performed using any of the available computational instructions as previously described. The next step in drawing a line segment involves specifying the INITIALIZE VECTOR instruction. Executing the INITIALIZE VECTOR instruction causes the offset $x$ coordinate contained in the primary accumulator 26 to be loaded into the $x$ register 70, the offset $y$ coordinate contained in the secondary accumulator 28 to be loaded into the $y$ register 80 and the value zero to be loaded into the counter of the line length timer 66. The values loaded into the $x$ and $y$ registers 70 and 80 are converted into proportional voltages by the $x$ and $y$ digital-to-analog converters 73 and 83 respectively. After a delay sufficient to allow the digital-to-analog converters 73 and 83 to settle, the initial position switches 74 and 84 are closed thereby enabling the capacitor $C_x$ and $C_y$ of the identical resistance-capacitance (RC) networks 76 and 86 to charge to the voltages being generated by the digital-to-analog converters 73 and 83. The voltages on the capacitors $C_x$ and $C_y$ connected to the $x$ and $y$ deflection drivers 77 and 87 respectively determine the positioning of the electron beam on the CRT display screen 18. After the offset $x$ and $y$ coordinates have been loaded from the accumulators 26 and 28, $\Delta x$ and $\Delta y$ values defining the length and direction of a line segment relative to an initial point are loaded into the primary and secondary accumulators 26 and 28 respectively using the necessary instructions. After the deflection fields determining the positioning of the electron beam on the face of th CRT display 18 have settled, the NORMALIZE VECTOR instruction is then specified. During the time that the deflection fields are settling, the computational section 20 of the system 10 is free to perform other calculation.

Execution of the NORMALIZE VECTOR instruction causes the initial position switches 74 and 84 to be opened, the $\Delta x$ and $\Delta y$ values contained in the primary and secondary accumulators 26 and 28 respectively to be shifted left (multiplied by a power of 2) until the level at the output of the OR gate 64 is high, and a value determined as a function of the number of left shifts to be loaded into the counter of the line length timer 66.

After shifting, the $x$ coordinate of the initial point offset by 1024 is added to the normalized $\Delta x$ value contained in the primary accumulator 26, and the $y$ coordinate of the initial point offset by 1024 is added to the normalized Δy value contained in the secondary accumulator 28.

The final instruction specified during the sequence of steps necessary for drawing a line segment is the START VECTOR instruction. Execution of the START VECTOR instruction first causes the sums contained in the primary and secondary accumulators 26 and 28 to be loaded into the x and y registers 70 and 80 respectively. After the digital-to-analog converters 73 and 83 (which convert the contents of the x and y registers 70 and 80 into proportional voltages) have settled, the line drawing switches 75 and 85 which connect the x and y digital-to-analog converters 73 and 83 to the resistors $R_x$ and $R_y$ respectively of the RC networks 76 and 86 are closed, the line length timer 66 is started, and the beam current switch 92 is closed thereby turning on the electron beam and enabling a visible line segment to be drawn on the CRT display screen 18. When the line length timer 66 reaches a predetermined count, the line drawing switches 76 and 86 and the beam current switch 92 are opened to stop line drawing and thereby complete the line segment.

While a line segment is being drawn on the CRT display screen 18 the computational section 20 is available for performing various tasks such as determining the parameters describing the next line segment to be drawn. The length of time available before a new line segment can be started is a function of the length of the line segment being drawn, longer line segments requiring longer times for completion. Because the drawing times necessary for different line segments vary with length, a signal indicating the completion of a line segment is sent from the display section 22 and referenced by the JUMP ON VECTOR NOT FINISHED conditional jump instruction. The JUMP ON VECTOR NOT FINISHED instruction is used to keep the program in a loop either performing necessary calculations or passing time until the line segment being drawn is completed, and only then enabling a new line to be started.

To prevent the images drawn on the CRT display screen 18 from flickering and to create the illusion of continuous motion as an object moves, the line segments creating the display are redrawn 33 times per second. The FRAME instruction is used to control the number of times per second a display is redrawn. Execution of the FRAME instruction causes the computational section 20 to remain halted until a 30 millisecond period is completed. For example, if the FRAME instruction is reached at 27 milliseconds after completion of the previous 30 millisecond period, the computational section 20 will remain halted for 3 milliseconds. After a 30 millisecond period is completed normal execution of the program instructions is again resumed, starting with the instruction immediately following the FRAME instruction.

Besides being able to generate an output consisting of objects composed of combinations of line segments on a CRT display screen 18, the video game system can output additional information through single bit output lines 57. The WRITE instruction included in the instruction set causes the contents of the least significant bit of the selected accumulator 26 or 28 to be loaded into a latch selected by the output selector 56 according to the address contained in the operand field of the instruction. Each latch is connected to an output line 57. These external output lines 57 enable the video game system 10 to operate lights, sound effects, coin boxes and various other output terminal devices.

The following table lists all of the instructions recognized by the video games system 10.

INSTRUCTION SET

FORMAT 1

Single Word, 8 Bit Operator, No Operand

LOAD PREVIOUSLY SELECTED

Loads the word previously selected by the contents of the working storage address register from the working storage memory into the selcted accumulator.

STORE PREVIOUSLY SELECTED

Stores the contents of the selected accumulator into the word previously selected by the contents of the working storage address register in the working storage memory.

ADD PREVIOUSLY SELECTED

Adds the words previously selected by the contents of the working storage address register from the working storage memory to the contents of the selected accumulator.

SUBTRACT PREVIOUSLY SELECTED

Subtracts the word previously selected by the contents of the working storage address register in the working storage memory from the contents of the selected accumulator.

AND PREVIOUSLY SELECTED

AND's the word previously selected by the contents of the working storage address register in the working storage memory with the contents of the selected accumulator.

INDIRECT ADDRESS PREVIOUSLY SELECTED

Loads the word previously selected by the contents of the working storage address register from the working storage memory into the working storage address register.

SECONDARY ACCUMULATOR

Causes the secondary accumulator to be selected during the execution of the next instruction. The absence of the secondary accumulator instruction preceding an instruction causes the primary accumulator to be selected unless otherwise stated.

LOOK-UP

Loads the word in the program memory addressed by the contents of the selected accumulator into the selected accumulator.

LOAD PROGRAM ADDRESS PREVIOUSLY SELECTED

Loads the word previously selected by the contents of the working storage address register from the working storage memory into the program address register.

JUMP

Causes the contents of the program address register to be loaded into the program address counter.

JUMP ON HIGH

Causes the contents of the program address register to be loaded into the program address counter if the level on an external input line is high. The program address counter is simply incremented by a single address if the condition is not met.

JUMP ON VECTOR NOT FINISHED

Causes the contents of the program address register to be loaded into the program address counter if a line segment is in the process of being drawn. The program address counter is simply incremented by a single address if the condition is not met.

JUMP ON ZERO
Causes the contents of the program address register to be loaded into the program address counter if the result of an arithmetic operation was zero. The program address counter is simply incremented by a single address if the condition is not met.

JUMP ON LESS THAN ZERO
Causes the contents of the program address register to be loaded into the program address counter if the result of an arithmetic operation was less than zero. The program address counter is simply incremented by a single address if the condition is not met.

JUMP ON GREATER THAN ZERO
Causes the contents of the program address register to be loaded into the program address counter if the result of an arithmetic operation was greater than zero. The program address counter is simply incremented by a single address if the condition is not met.

SHIFT RIGHT
Causes the contents of the selected accumulator to be shifted right one place.

SHIFT RIGHT BOTH
Causes the contents of both the primary and secondary accumulators to be shifted right one place simultaneously. The carry out from the secondary accumulator is connected to the carry in of the primary accumulator.

ARITHMETIC SHIFT RIGHT
Causes the contents of the selected accumulator to be shifted right one place while forcing the most significant bit to remain unchanged.

SHIFT LEFT
Causes the contents of the selected accumulator to be shifted left one place.

SHIFT LEFT BOTH
Causes the contents of both the primary and secondary accumulator to be shifted left one place simultaneously.

MULTIPLY
Causes both the primary and secondary accumulators to be shifted right one place simultaneously and the contents of the selected word from the working storage memory to be added to the secondary accumulator if a one was shifted out of the primary accumulator.

INITIALIZE VECTOR
Initializes the vector generating sequence and causes the x and y coordinates of the initial point of the line segment to be drawn to be loaded into the x and y registers from the primary and secondary accumulators respectively.

NORMALIZE VECTOR
Causes $\Delta x$ and $\Delta y$ the parameters defining the length and direction of the line segment to be drawn to be normalized in preparation for generating the vector. $\Delta x$ and $\Delta y$ are previously loaded into the primary and secondary accumulators respectively where the normalization by simultaneous left shifts occurs.

START VECTOR
Causes the drawing of the line segment to be started.

FRAME
Causes the computational section of the system to remain halted until a 30 millisecond period is completed.

FORMAT 2

Single Word, 4 Bit Operator, 4 Bit Operand
LOAD PAGE
Loads the 4 bit address carried with instruction into the page register.

LOAD
Loads the word selected by the contents of the page register and the 4 bit address carried with the instruction from the working storage memory into the selected accumulator.

STORE
Stores the contents of the selected accumulator into the word selected by the contents of the page register and the 4 bit address carried with the instruction into the working storage memory.

ADD
Adds the word selected by the contents of the page register and the 4 bit address carried with the instruction from the working storage memory to the selected accumulator.

SUBTRACT
Subtracts the word selected by the contents of the page register and the 4 bit address carried with the instruction in the working storage memory from the selected accumulator.

TEST
Subtracts the word selected by the contents of the page register and the 4 bit address carried with the instruction in the working storage memory from the contents of the selected accumulator without modifying the contents of the accumulator. Only the equal to zero, less than zero and greater than zero conditions flags are set.

INDIRECT ADDRESS
Loads the word selected by the contents of the page register and the 4 bit address carried with the instruction from the working storage memory into the working storage address register.

LOAD IMMEDIATE
Loads the 4 bits of data carried along with the instruction into the upper 4 bits of the selected accumulator while loading zeroes into the lower 8 bits.

ADD 4 IMMEDIATE
Adds the 4 bits of data carried along with the instruction to the contents of the selected accumulator.

SUBTRACT 4 IMMEDIATE
Subtracts the 4 bits of data carried along with the instruction from the contents of the selected accumulator.

READ
Loads the signal level on one of sixteen external input lines selected by the 4 bit address carried along with the instruction into the least significant bit of the selected accumulator.

WRITE
Loads the contents of the least significant bit of the selected accumulator into one of eight external output latches selected by the 4 bit address carried along with the instruction.

FORMAT 3

Double Word, 8 Bit Operator, 8 Bit Operand
ADD 8 IMMEDIATE
Adds the 8 bits of data carried along with the instruction to the contents of the selected accumulator.

SUBTRACT 8 IMMEDIATE
Subtracts the 8 bits of data carried along with the instruction from the contents of the selected accumulator.

FORMAT 4

Double Word, 4 Bit Operator, 12 Bit Operand
LOAD PROGRAM ADDRESS IMMEDIATE
Loads the 12 bit address carried along with the instruction into the program address register.

VIDEO GAME OPERATION

The operation and capabilities of the video game system 10 may be best described by presenting several exemplary programs. The examples chosen range from sequencing through a simple statement to the description of a complete game in terms of functional routines.

The first example involves explaining the sequence of steps necessary for the execution of the computational statement $B = A + 2$. In the working storage memory 32 the variable A has been assigned location 4 and the variable B has been assigned location 7. The instructions necessary to execute the statement are as follows:

PAGE (0)

LOAD (4)

ADD 4 IMMEDIATE (2)

STORE (7)

The number in parenthesis () after each instruction is the value contained in the instruction's operand field. Conditions prior to the execution of the statement:

A. Program address counter 44 contains the address of the second instruction;

B. Both the instruction register 40 and the data and address register 38 contain the first instruction, PAGE (0);

C. Sequence counter (included in the system sequencer 34) is in state zero;

D. Primary accumulator 26 is selected.

SEQUENTIAL EXECUTION OF THE STATEMENT

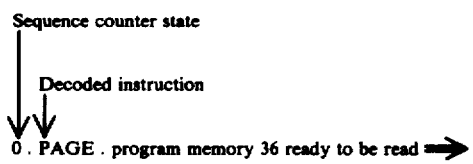

load the page register 52 from bits 4-7 of the data and address register 38; increment the program address counter 44; load both the instruction register 40 and the data and address register 38 from the program memory 36; reset the sequence counter.

0 · LOAD→load the working storage address selector and register 50 from both the page register 52 and the data and address register 38; increment the sequence counter.

1 · LOAD · program memory 36 ready to be read · working storage memory 32 ready to be read→load the primary accumulator 26 from the working storage memory 32 through the data selector 48 and the arithmetic logic unit 30; load both the instruction register 40 and the data and address register 38 from the program memory 36; increment the program address counter 44; reset the sequence counter.

0 · ADD 4 IMMEDIATE→in the arithmetic logic unit 30, add bits 4-7 of the data and address register 38 (connected through the data selector 48) to the contents of the primary accumulator 26 (connected through the accumulator selector 24) loading the resulting sum into the primary accumulator 26; load both the instruction register 40 and the data and address register 38 from the program memory 36; increment the program address counter 44; reset the sequence counter.

0 · STORE→load the working storage address selector and register 50 from both the page register 52 and the data and address register 38; write the contents of the primary accumulator 26 connected through the accumulator selector 24 into the working storage memory 32; increment the sequence counter.

1 · STORE · program memory ready to be read · working storage memory 32 ready→load both the instruction register 40 and the data and address register 38 from the program memory 36; increment the program address counter 44; reset the sequence counter.

The second example program together with one of the digital-to-analog converters 73 or 83 included in the display section 22 and an external voltage comparator 96 provides an analog-to-digital converter. Using the same digital-to-analog converter 73 or 83 for both generating vectors and analog-to-digital conversions minimizes the number of necessary components thereby reducing the cost of a complete system. FIG. 4 shows the interconnections of the components included in the analog-to-digital converter. The output from the x digital-to-analog converter 73 is connected to the inverting (−) input of a voltage comparator 96, and a variable resistor 97 providing an analog voltage to be converted into a proportional digital number is connected to the non-inverting (+) input of the same comparator 96. The output from the comparator 96 (which is high when the voltage on the inverting input (−) is greater) is connected to the JUMP ON HIGH input. In operation, the video game system 10 using the JUMP ON HIGH conditional jump instruction periodically examines the output of the comparator 96 and essentially through a trial and error binary search comes up with a number that causes the x digital-to-analog converter 73 to generate a voltage that matches the voltage from the variable resistor 97. Such a program and hardware configuration (shown in FIG. 4) would be used when a game requires the operator to be able to input an analog response.

In the present example component values have been chosen such that the minimum setting on the variable resistor 97 will result in the valve 0 being generated and the maximum setting will result in the valve 1024 being generated. The flowchart describing the analog-to-digital converter program is shown in FIG. 5. For purposes of implementing the analog-to-digital converter flowcharted in FIG. 5, the variable HALF has been assigned location 1 in the working storage memory 32 and the variable DIGITAL-VALUE location 2. In the following program listing a number shown in parenthesis () after an instruction is the value contained in that instruction's operand field.

| | PROGRAM |
|---|---|
| Memory Location | Instruction |
| 0 | SECONDARY ACCUMULATOR |
| 1 | LOAD IMMEDIATE (0) |
| 2 | SECONDARY ACCUMULATOR |
| 3 | ADD 4 IMMEDIATE (10) |
| 4 | PAGE (0) |
| 5 | LOAD IMMEDIATE (512) |
| 6 | STORE (1) |
| 7 | INITIALIZE VECTOR GENERATOR |
| 8 | LOAD (1) |
| 9 | SHIFT RIGHT |
| 10 | STORE (1) |
| 11 | LOAD PROGRAM ADDRESS IMMEDIATE (20) |
| 12 | • |
| 13 | JUMP ON HIGH |
| 14 | LOAD (2) |
| 15 | SUBTRACT (1) |
| 16 | STORE (2) |

-continued

| Memory Location | PROGRAM Instruction |
|---|---|
| 17 | LOAD PROGRAM ADDRESS IMMEDIATE (23) |
| 18 | * |
| 19 | JUMP |
| 20 | LOAD (2) |
| 21 | ADD (1) |
| 22 | STORE (2) |
| 23 | SECONDARY ACCUMULATOR |
| 24 | SUBTRACT 4 IMMEDIATE (1) |
| 25 | LOAD PROGRAM ADDRESS IMMEDIATE (7) |
| 26 | * |
| 27 | JUMP ON GREATER THAN ZERO |

*As previously explained the LOAD PROGRAM ADDRESS IMMEDIATE instruction is a double word instruction requiring 2 sequential locations in the program memory 36.

The immediately foregoing analog-to-digital converter program requires 28 words of program memory. After going through the main loop of the program 10 times as specified, approximately 145 instructions will have been executed requiring 87 microseconds at the rate of 600 nanoseconds per instruction. The period of the clock used to drive the video game system 10 is approximately 200 nanoseconds (5MHz).

Figure 6:
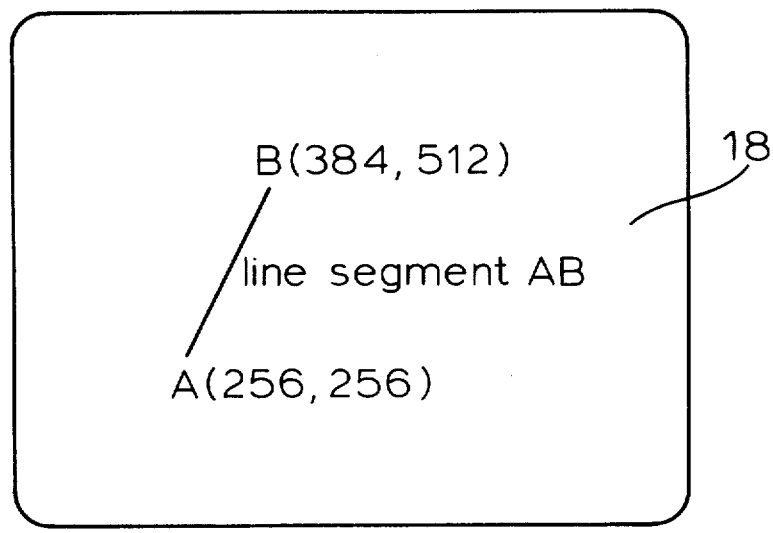
FIG. 6 is a pictorial view of a line segment AB drawn on the screen of the display device of FIG. 1.

The third example program demonstrates the operation of the display section 22 of the video game system 10. A line segment AB is drawn from point A with $x = 256$ and $y = 256$ to point B with $x = 384$ and $y = 512$ on the display screen 18 as shown in FIG. 6. The parameters necessary for specifying line segment AB are the Cartesian coordinates of point A and the $\Delta x$ and $\Delta y$ values defining the length and direction of the line segment relative to point A. In order that the line segment will appear on the CRT display screen 18 at the desired location, the $x$ and $y$ coordinates of point A are offset by 1024. The 1024 offset is necessary to the operation of the display section 22. After offsetting, the $x$ and $y$ coordinates of point A will each take on the value 1280 (256 + 1024). The $\Delta x$ and $\Delta y$ parameters are assigned the values 128 (384 − 256) and 256 (512 − 256) respectively.

Figure 7:
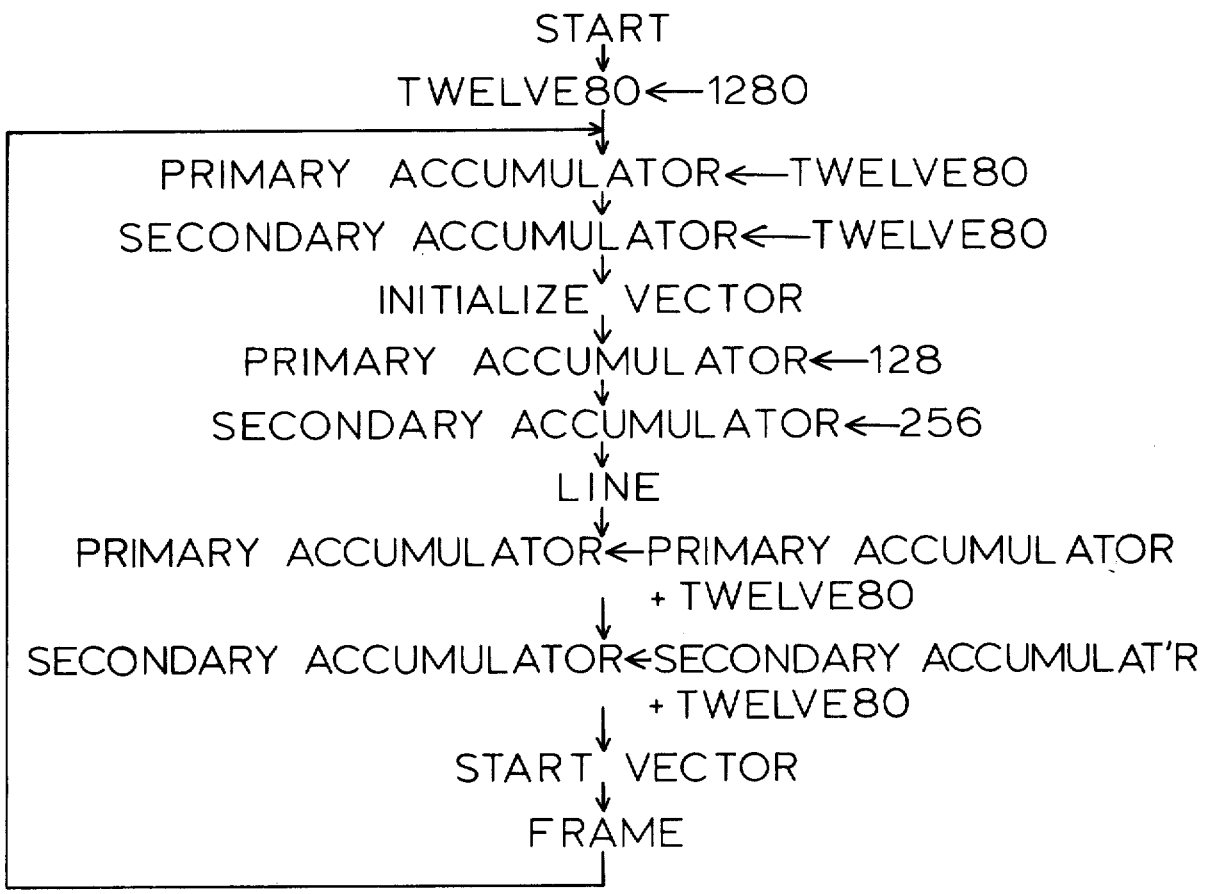
FIG. 7 is a flowchart describing the sequential steps necessary to generate the line segment AB of FIG. 6.

Initially 1280, the offset value of each of the $x$ and $y$ coordinates of point A is loaded into the primary and secondary accumulators 26 and 28, respectively. Next, the INITIALIZE VECTOR instruction is specified causing the $x$ and $y$ coordinates of point A to be loaded into the display section 22 thereby positioning the electron beam to point A on the screen 18. $\Delta x = 128$ and $\Delta y = 256$ being the parameters specifying point B of the line segment relative to point A are then loaded into the primary and secondary accumulators 26 and 28 respectively. Execution of the NORMALIZE VECTOR instruction causes the $\Delta x$ and $\Delta y$ values contained in the two accumulators to be normalized. After normalization, 1280 which is the offset value of both initial point coordinates is added to the normalized contents in the two accumulators. Finally, the START VECTOR instruction is specified causing the electron beam to be turned on and a visible line segment to be drawn from point A to point B. The same sequence is repeated 33 times per second in order that the line segment will appear solid without flickering. For purposes of implementing the line drawing program flowcharted in FIG. 7, the variable TWELVE 80 has been assigned location 1 in the working storage memory 36.

| Memory Location | PROGRAM Instruction |
|---|---|
| 0 | PAGE (0) |
| 1 | LOAD IMMEDIATE (1280) |
| 2 | STORE (1) |
| 3 | LOAD (1) |
| 4 | SECONDARY ACCUMULATOR |
| 5 | LOAD (1) |
| 6 | INITIALIZE VECTOR |
| 7 | LOAD IMMEDIATE (0) |
| 8 | ADD 8 IMMEDIATE (128) |
| 9 | * |
| 10 | SECONDARY ACCUMULATOR |
| 11 | LOAD IMMEDIATE (256) |
| 12 | NORMALIZE VECTOR |
| 13 | ADD (1) |
| 14 | SECONDARY ACCUMULATOR |
| 15 | ADD (1) |
| 16 | START VECTOR |
| 17 | FRAME |
| 18 | LOAD PROGRAM ADDRESS IMMEDIATE (3) |
| 19 | * |
| 20 | JUMP |

*The LOAD PROGRAM ADDRESS IMMEDIATE and ADD 8 IMMEDIATE instructions are both double word instructions each requiring 2 sequential locations in the program memory 36.

The sample line segment program requires 21 words of program memory and gets repeated 33 times per second to prevent the line from flickering. The repetition rate is determined by the FRAME instruction. Execution of the instructions included in the program together with drawing the line segment requires approximately 100 microseconds. Thus, the system will remain halted at the FRAME instruction for over 29 milliseconds out of every 30 millisecond frame period.

Figure 8:
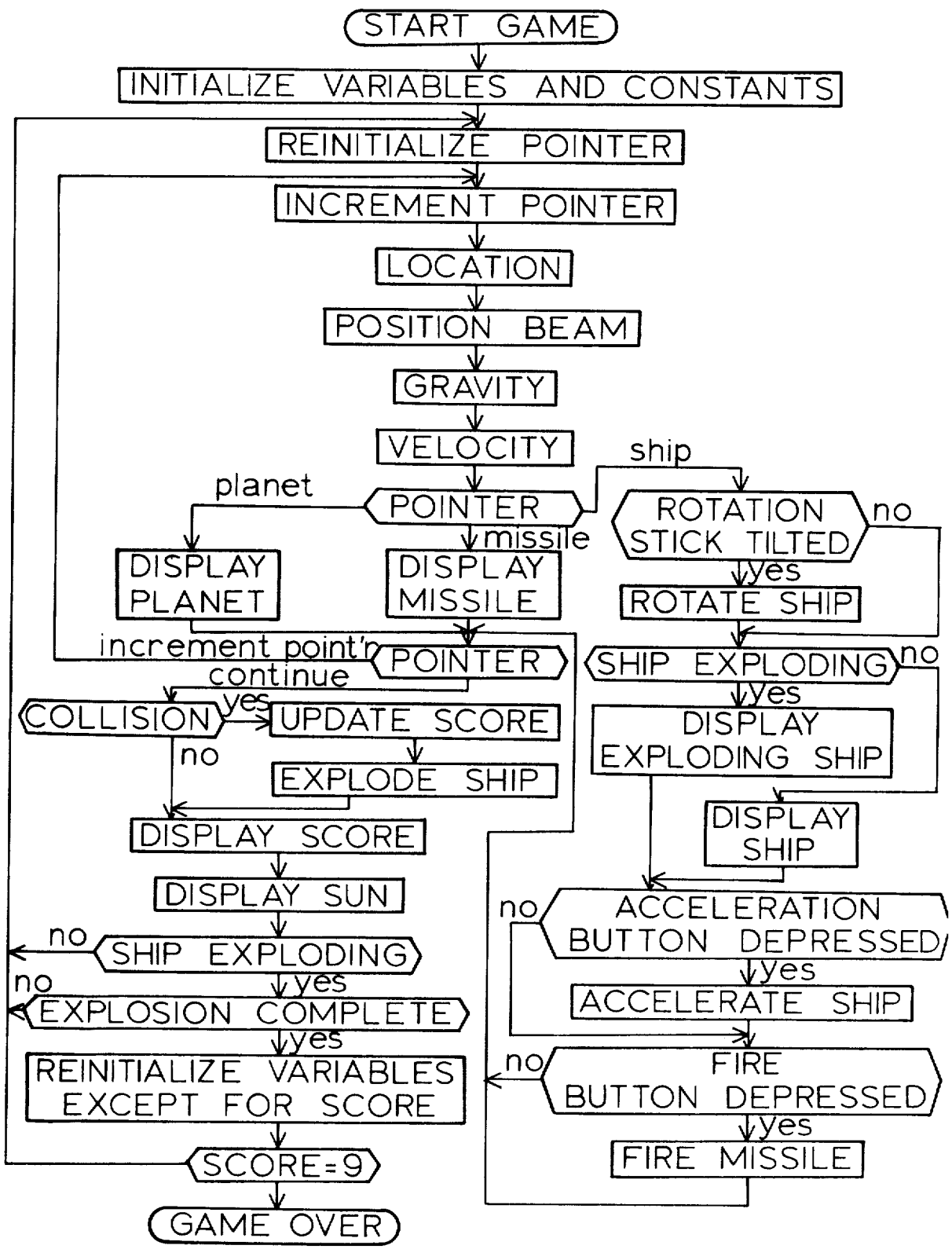
FIG. 8 is a flowchart describing the operation of a space war video game in terms of functional routines as played on the system of FIG. 1.

The fourth example is a complete game program typical of a game that may be implemented on the present invention and made available to participating players for entertainment purposes. The following description of the game and the SPACE WAR flowchart shown in FIG. 8 covers the program in terms of functional routines. Each functional routine included in the SPACE WAR game such as GRAVITY, VELOCITY, DISPLAY PLANET and so forth is in itself a lengthy routine, typically comprised of several hundred instructions. However, the techniques used in writing these functional routines are the same as those used in writing the previous program examples. For example, the DISPLAY PLANET routine constructs each planet from a sequence of individual short line segments. Such a routine is written by following the example used for generating a single line segment and changing the data for each line segment needed to construct the planet.

When the SPACE WAR program is first started, variables and constants which have been assigned locations in the working storage memory 32 are loaded with initial values from the program memory 36. The values loaded into the variables at this time determine the initial positions and velocities of the ships 14 and 16 and any planets or other objects appearing on the screen 18.

A variable referred to as a pointer is initially loaded with a value that both indicates the first object to be displayed and points to the parameters describing the positioning and trajectory of the object. When the value of the pointer is added to a position offset, a velocity offset or any other offset used in the program, the sum will yield the working storage memory address of the $x$ component parameter required by the particular routine associated with the offset. When the value of the pointer plus 1 is added to an offset the sum yields the memory address of the $y$ component parameter. Parameters associated with the same function but determining x and y components are stored in adjacent memory locations.

The first routine executed updates the location of the ship, missile or planet as indicated by the value of the pointer. The x and y velocities of the ship, missile or planet being relocated (moved across the display screen) are added to the previous location yielding a new location. The location routine also guarantees that the ship, missile or planet remains on the CRT display screen 18. If the ship, missile or planet is about to go off the screen at the top it is assigned the location of the bottom of the screen or if it is about to go off of the left side it is assigned the location of the right side and so forth to create a wraparound effect.

After the location of a ship, missile or planet has been determined, the display section is given the coordinates of the center point of the ship, missile or planet so that the beam can start moving towards that position. Previously the beam was at the position of another ship, missile or planet that could have been located any place on the screen, near or far from the ship, missile or planet being positioned. The beam is repositoned at this time so that it will have settled at the designated position by the time that the system is ready to start drawing the ship, missile or planet.

A gravitational sun is located in the center of the screen. The gravitational forces on the ships, missiles and planets are calculated using Newton's equations of motion. In solving for the x and y component gravitational accelerations acting upon a ship, missile or planet, first the radius from the sun to the ship, missile or planet is calculated. Next the radius offset by a constant is used to address a location in a look-up table contained in the program memory. The value returned from the addressed location in the look-up table is proportional to $1/radius^3$. Finally, a constant, the returned value for $1/radius^3$, and the x component of the position are multiplied together yielding the x component gravitational acceleration. The same multiplicaton is then repeated using the y component of the position yielding the y component gravitational acceleration.

The velocity routine adds the current x and y acceleration values to the x and y velocity values of the ship, missile or planet being repositioned. An additional function of the velocity routine is to limit the maximum velocity of a ship. If the maximum velocity of a ship is not restricted, inexperienced players would tend to loose control of their ships and become frustrated.

After updating the velocity of a ship, missile or plane the same is ready to be drawn. At this pint in the execution of the program the CRT beam is at the desired location having been allowed to reposition itself and settle while the gravity and velocity calculations needed to update the next position of the ship, missile or planet were being executed. First the value of the pointer is examined to determine whether a ship, missile or planet is to be drawn. To draw a missile the display section is simply instructed to plot a point at the location that was already loaded for purposes of positioning the beam. To draw a planet the parameters defining the line segments necessary to construct a planet are retrieved from a table in the program memory and passed along to the display section. Displaying a ship is more complicated. The information defining the appearance of a ship is contained in the program memory as a series of coordinate points, each coordinate point being an end point of a line segment defining the outline of a ship. To facilitate the rotaton of a ship, the stored end points are defined in terms of polar coordinates. Rotating the entire set of polar coordinate end points is achieved by simply incrementing every angle by the value of the angular rotation variable. The value of the angular rotation variable is determined by the rotation routine, a software modular counter which either increments the value, decrements the value or leaves it unchanged, depending on whether or not the associated joy stick 19 shown on the control panel 12 of FIG. 1 is tilted left, tilted right or remains in its untouched vertical position by the player. After the rotation of a set of end points, the points are converted into Cartesian coordinates using a sine table stored in the program memory. Finally, the sequentially listed, rotated, and converted end points are used to determine the parameters necessary for the display section to draw the line segments from which a ship is constructed. If an exploding ship is to be drawn (as, for example, one shot by a missile or falling into the sun) such as the ship 14 displayed on the CRT screen 18 in FIG. 1, a series of end points defining an exploding ship instead of an intact ship are referenced and converted into an image using the same techniques.

The acceleration routine causes a ship to be accelerated in the forward direction when the associated accelerate button 16 is pressed by the player. When the associated acclerate button 15 is pressed the x and y coordinates of the front of the ship relative to the ship's center of gravity are added to the value of the variable defining the ship's acceleration.

When the associated missile fire button 17 is pressed a missile is assigned the coordinates of the front of the ship from which it is being fired. A button held down continuously is ignored; it must be released and pressed again to fire another missile. The velocity with which the missile leaves the ship is the vector sum of a fixed velocity in the direction the ship is pointed and the velocity of the ship itself. Also, when a missile is fired a variable which indicates that the missile is active is loaded with a value that is repetitively decremented. If the decremented value reaches zero before the missile hits a ship it disappears from the screen. Because it takes a finite amount of time to locate and display a missile, each ship is limited to a specified number of missiles on the screen at a time.

After a ship, missile or planet is drawn the value of the pointer is again examined to determine if all of the ships, missiles and planets have been repositioned and drawn. If the value of the pointer indicates that everything has not been repositioned and drawn the value is incremented to point to the parameters defining the next ship, missile or planet, and the loop just described is repeated. Otherwise, if the value of the pointer indicates theat everything is complete, the collision and scoring routines are executed.

The collision detection routine checks for a collision between: (a) two ships, (b) a ship and a missile, (c) a ship and the sun, or (d) a ship and a planet. A hit is detected when the center point of a ship falls within a specified $\pm \Delta x$ and $\pm \Delta y$ of the center of another object. If a ship is hit, flags are set that cause the doomed ship to be drawn from points in an exploding ship table depicting the scattering of pieces of a ship. Also if a ship is destroyed, a variable assigned to the other ship is incremented and used for keeping score. Seven segment numbers are used for displaying the score with the decoding of the segments done through a look-up table stored in the program memory.

After the collision detection routine has been executed the sun is displayed. The sun is made up of a cluster of radial line segments, half of which are displayed every other frame to give it a flickering effect.

When no ships have been hit or when a hit ship is still in the process of exploding, the value of the pointer is reinitialized so as to point to the first ship in preparation for the program to begin again the program loop just described. If a ship has been hit and the explosion has been completed, all of the variables except for the score variables are reinitialized enabling another contest to be played. Also, at this point in the program if a player has attained a score of 9 hits the game is ended.

From the foregoing description of the preferred embodiment of the present invention it will be readily appreciated by those skilled in the art that an unlimited variety of controllable simulations and video games may be carried out by the video game system 10. The programming techniques used by the system 10 have been described in sufficient detail to enable those skilled in the art to construct instruction routines to implement whatever simulations or video games are sought by the programmer. Thus, it is to be appeciated that the exemplary programs are illustrative and instructive and are not limiting in any sense. Also, many changes in circuitry and system architecture will suggest themselves to those skilled in the art without departing from the spirit and scope of my invention.

I claim:

1. A method of implementing a computational system and a display system with a shared single digital processor to provide a visual simulation system calling for active participation by operators wherein realistic visual simulations of objects are drawn from a series of line segments on the display screen of a cathode ray tube in accordance wih simulation rules and operator commands, said method comprising the steps of
   repeatedly calculating within said system display parameters needed to specify said series of line segments, and
   repeatedly displaying said series of line segments on said display screen in accordance with said display parameters to provide said visual simulations of objects which may move and change size, shape and orientation as said simulation progresses;
   for each line segment;
   calculating Cartesian coordinates of a starting point of said line segment and calculating component values defining said line segment relative to its said starting point from said data and said operator commands in accordance with said simulation rules;
   displaying said line segment on said screen by:
   convering said Cartesian coordinates into deflection voltages directly related to the magnitudes of said Cartesian coordinates;
   charging networks having the same time constant to the respective levels of said deflection voltages;
   positioning a drawing beam in said cathode ray tube at a starting point of said line segment on said display screen with said deflection voltages to which said networks have charged;
   converting said line component value into drawing voltages directly related to the magnitudes of said values;
   turning on said beam to start drawing said line segment on said display screen and applying said drawing voltages to said charged networks to deflect said beam along the display locus of said line segment being drawn; and
   turning off said drawing beam in accordance with said drawing duration gating signal when a terminal end of said line segment has been reached by said drawing beam.

2. The method of claim 1 wherein said step of converting said line component values into drawing voltages includes for each line segment the steps of
   normalizing said component values by repeatedly multiplying said component values by the same factor until the larger of the resultant products equals or exceeds a predetermined normalization constant;
   adding each of said products to each of said starting point Cartesian coordinates respectively to produce sums; and
   reducing the time required to draw said line segment by an amount related to the number of multiplication repetitions utilized in normalizing said component value to provide a drawing duration gating signal.

3. The method of claim 2 being repeated for each said line segment at a frequency such that said visual simulations of objects on said display screen appear without noticeable flickering thereof being seen by said operator.

4. The method of claim 3 wherein said frequency is determined by the step of repeating the display of said series of line segments after a predetermined time interval which is measured from a first step of a sequence of steps followed to display said series of line segments once.

5. The method of claim 1 wherein said step of repeatedly calculating display parameters is accomplished by calculating said parameters in said digital processor, and wherein said step of repeatedly displaying said series of line segments is accomplished by controlling said cathode ray tube by said digital processor.

6. The method of claim 5 wherein said single digital processor
   calculates said display parameters needed to specify said series of line segments from said data and said operator commands in accordance with said simulation rules while functioning with said computational system, and
   calculates information necessary to draw said series of line segments on said display screen from said display parameters while functioning with said display system.

7. The method of claim 6 wherein said step of calculating said display parameters includes for each line segment the steps of
   calculating Cartesian coordinates of a starting point of said line segment and component values defining said line segment relative to its said starting point from said data and said operator commands in accordance with said simulation rules;
   and wherein said step of calculating said information necessary to draw said series of line segments on said display screen includes for each line segment the steps of
   normalizing said component values by repeatedly multiplying said component values by the same factor until the larger of the resultant products equals or exceeds a predetermined normalization constant;

adding each of said products to each of said starting point Cartesian coordinates respectively to produce sums; and reducing the time required to draw said line segment by an amount related to the number of multiplication repetitions utilized in normalizing said component values to provide a drawing duration gating signal.

8. The method of claim 1 wherein said system accomplishes the further step of performing calculations related to said simulation which are not necessarily directly related to the line segment to be drawn during the time interval that said networks are charging to the levels of said deflection voltages.

9. The method of claim 1 wherein said system accomplishes the further step of performing calculations related to said simulation which are not directly related to the operation of said display system while said drawing beam is drawing a line segment.

10. In a visual image operator interactive game system including an operator controlled input, a digital computer connected to said input and having a program memory storage, means for addressing said program memory storage, holding means for receiving and holding instructions and data output from said program memory storage, system sequencer means connected to said holding means for sending control signals within said computer in accordance with instructions, an arithmetic logic unit, a data selector, a working storage memory and a working storage address selector and register connected directly to said working storage memory, and wherein said system further includes an $x$ and $y$ planar coordinate output visual display including an $x$ coordinate generator and a $y$ coordinate generator therein and with which said operator may interact, the improvement comprising:

said working storage memory being connected directly to said data selector;

said data selector being connected directly to said arithmetic logic unit;

a primary accumulator and a secondary accumulator;

said arithmetic logic unit being connected directly to said primary accumulator and to said secondary accumulator;

an $x$ coordinate register and a $y$ coordinate register;

one of said primary accumulator and said secondary accumulator being connected to said $x$ coordinate register and the other being connected to said $y$ coordinate register;

said $x$ coordinate register being connected to said $x$ coordinate generator, and said $y$ coordinate register being connected to said $y$ coodinate generator;

an accumulator selector having inputs connected directly from said primary accumulator and said secondary accumulator and having outputs connected directly to said arithmetic logic unit and to said working storage memory.

11. The game set forth in claim 10 wherein said display includes a cathode ray tube, wherein said primary accumulator comprises a multiple-bit shift register, said secondary accumulator comprises a multiple-bit shift register, and further comprising a first Exclusive OR gate having an output and two inputs each connected to a preselected output bit position of said primary accumulator; a second Exclusive OR gate having an output and two inputs each connected to a preselected output bit position of said secondary accumulator, an OR gate having two inputs connected to the outputs of said first and second Exclusive OR gates and an output connected to said system sequencer means, said system sequencer means being connected to said primary accumulator and to said secondary accumulator to enable shift left operation therein and being connected to said cathode ray tube, said computer further comprising a line length timer connected to said system sequencer for responding to the number of left shifts directed by said sequencer, and for enabling said sequencer to operate said cathode ray tube display in accordance with said number of left shifts.

12. The apparatus of claim 10 wherein said digital storge means includes a modifiable program memory whereby data and rules stored therein may be changed to change the simulation.

13. The apparatus of claim 10 wherein said digital storage means comprises a replaceable programmed memory wherein the simulation may be changed by replacing said replaceable memory.

14. The apparatus of claim 10 wherein said digital processing means includes a random access memory means for storing constants and intermediate and final computational results necessary to the generation of a visual simulation.

* * * * *